(12) United States Patent  
Spink et al.

(10) Patent No.: US 9,677,674 B2
(45) Date of Patent: Jun. 13, 2017

(54) ADJUSTABLE CLAMP

(71) Applicants: Scott Spink, Spokane, WA (US); Christopher Henjum, Deer Park, WA (US); Bruce Hedlund, Kirkland, WA (US)

(72) Inventors: Scott Spink, Spokane, WA (US); Christopher Henjum, Deer Park, WA (US); Bruce Hedlund, Kirkland, WA (US)

( * ) Notice: Subject to any disclaimer, the term of this patent is extended or adjusted under 35 U.S.C. 154(b) by 0 days.

(21) Appl. No.: 14/712,840

(22) Filed: May 14, 2015

(65) Prior Publication Data

US 2015/0330516 A1 Nov. 19, 2015

Related U.S. Application Data

(60) Provisional application No. 61/994,752, filed on May 16, 2014.

(51) Int. Cl.
| | |
|---|---|
| *F16K 7/04* | (2006.01) |
| *F16K 37/00* | (2006.01) |
| *F16K 7/06* | (2006.01) |

(52) U.S. Cl.
CPC ............... *F16K 7/04* (2013.01); *F16K 7/061* (2013.01); *F16K 37/0008* (2013.01); *F16K 37/0058* (2013.01)

(58) Field of Classification Search
CPC .......... F16K 7/04; F16K 7/06; F16K 37/0058; F16K 37/0008
USPC ........................ 251/4, 7, 8, 9, 10; 137/556
See application file for complete search history.

(56) References Cited

U.S. PATENT DOCUMENTS

| | | | | |
|---|---|---|---|---|
| 2,890,848 | A * | 6/1959 | Johnson, Jr. ......... | B23Q 3/1546 248/206.5 |
| 3,570,531 | A * | 3/1971 | McGay ............... | A61M 39/286 137/556 |
| 4,337,791 | A * | 7/1982 | Tech .................. | A61M 39/286 137/556 |
| 4,824,066 | A * | 4/1989 | Smith ................ | A61F 9/013 24/514 |
| 7,559,525 | B2 * | 7/2009 | Grimes ............... | F16K 7/063 251/8 |
| 8,317,526 | B2 * | 11/2012 | Gardner ............. | H01R 4/36 24/489 |
| 9,266,478 | B2 * | 2/2016 | Patel ................. | B60R 9/045 |

* cited by examiner

*Primary Examiner* — Jessica Cahill
*Assistant Examiner* — Daphne M Barry
(74) *Attorney, Agent, or Firm* — Randall Danskin P.S.

(57) ABSTRACT

The present discussion relates to tubing clamps and systems employing tubing clamps. In one example a tubing clamp can include generally elongate top and bottom clamp bars extending between a hinge end and a clamp end. The clamp bars can apply force to tubing extending there between while being adjusted to a parallel relationship to one another.

11 Claims, 5 Drawing Sheets

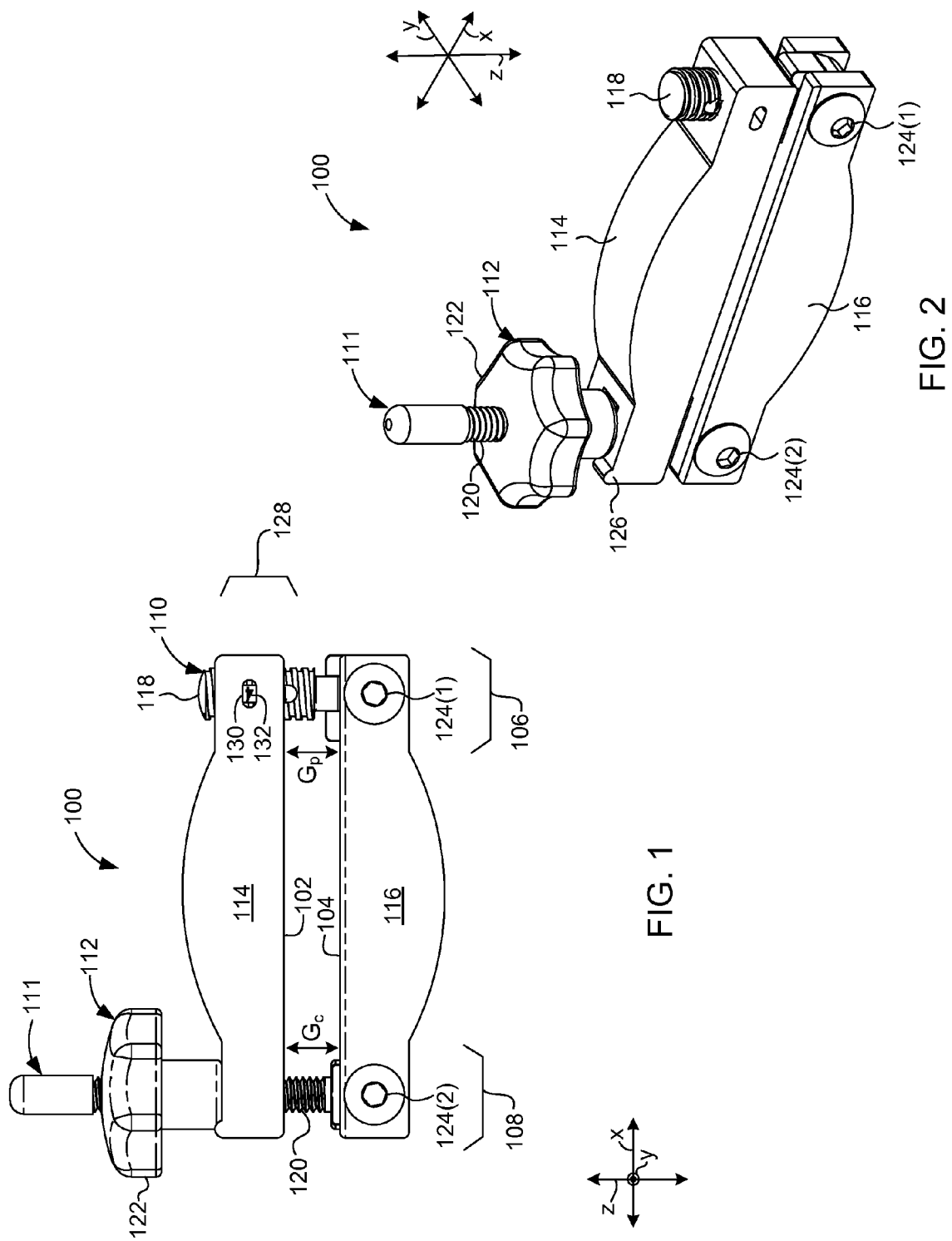

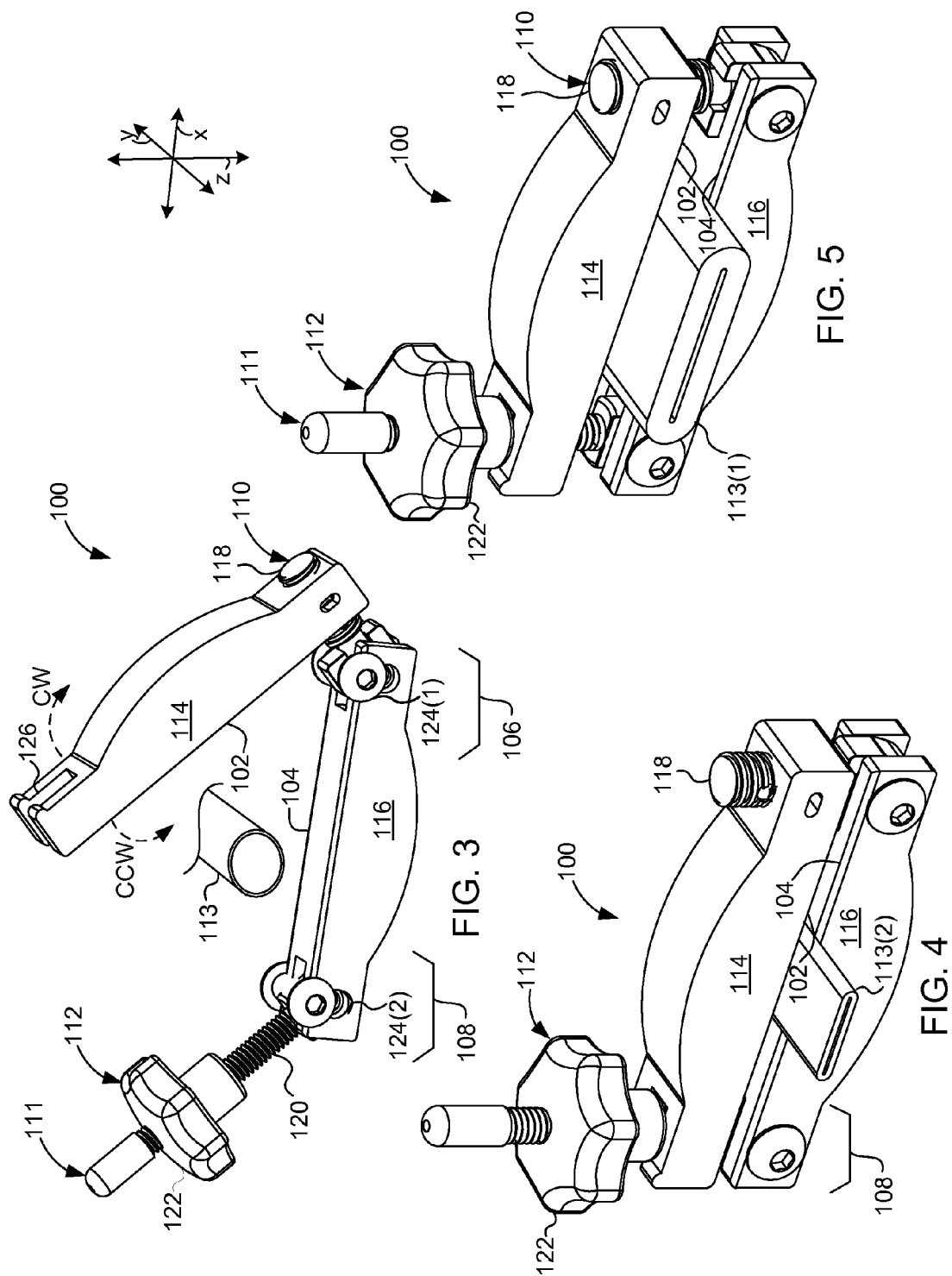

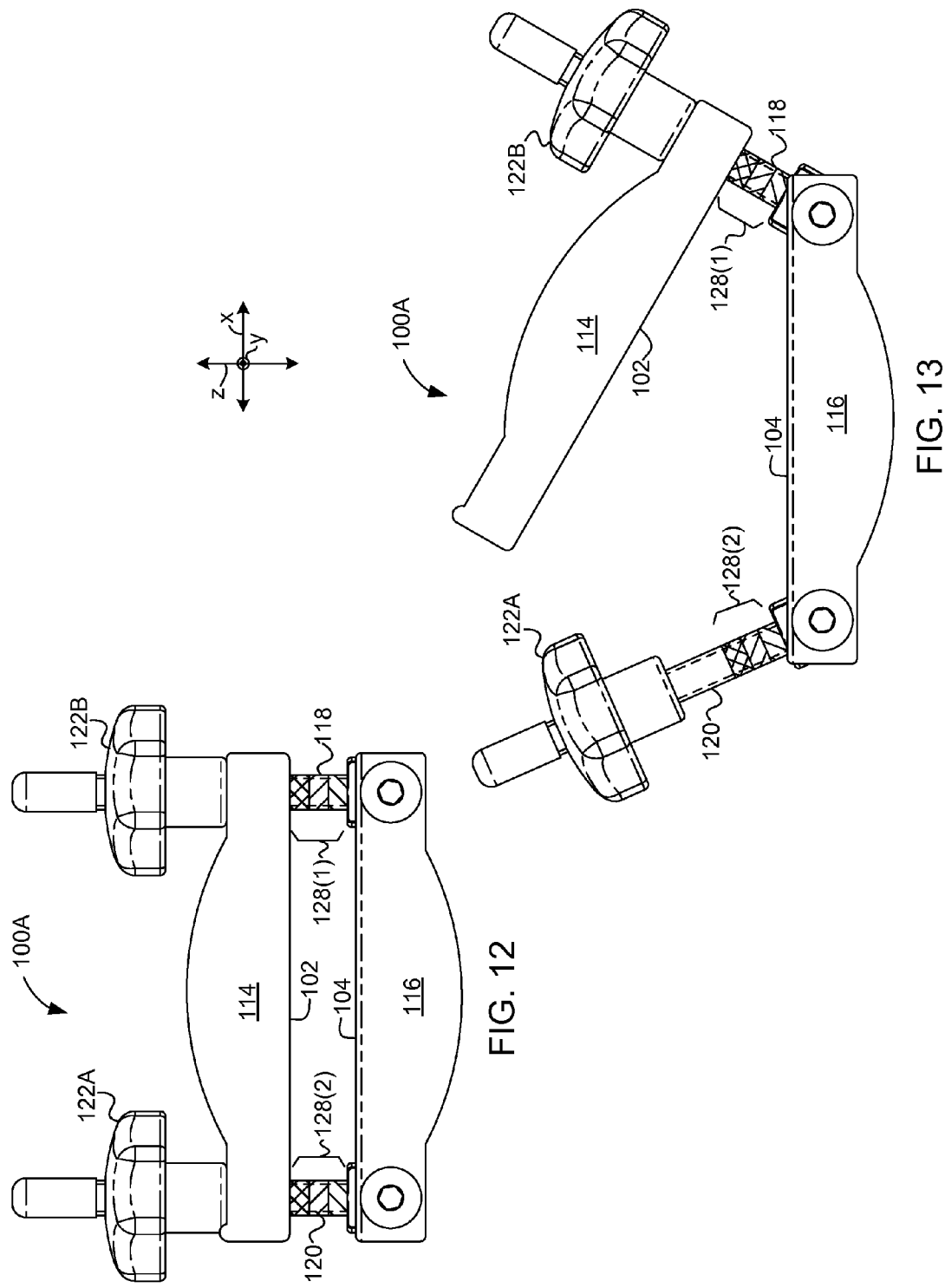

ADJUSTABLE CLAMP

PRIORITY

This utility application claims priority from, U.S. Provisional Application No. 61/994,752 filed on 2014 May 16, which is incorporated by reference in its entirety.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, where feasible the left-most numeral of each reference number conveys the figure and associated discussion where the reference number is first introduced.

FIGS. 1, 6-8, and 12-13 illustrate side elevational views of tubing clamp examples in accordance with some of the present concepts.

FIGS. 2-5 and 9 illustrate isometric views of tubing clamp examples in accordance with some of the present concepts.

DETAILED DESCRIPTION

Overview

Figure 7:
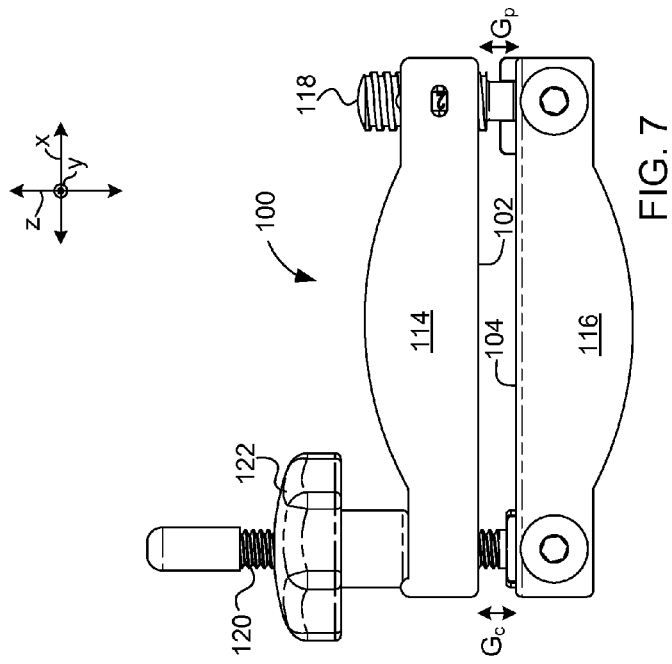

The present description relates to apparatus manifest as tubing clamps. As used herein, 'tubing' is intended to be inclusive of hoses, flexible pipe and/or any other resilient material through which fluids can travel. The tubing clamp can apply forces to the tubing to temporarily reduce and/or stop the flow of fluid through the tubing. The tubing clamp can be characterized as a device with a variable adjustment feature which enables the tubing clamp to work with various sizes and shapes of flexible tubing while maintaining a uniform and repeatable clamping force. The variable adjustment feature can allow first and second clamping surfaces to be set at a desired distance from one another to apply a force on the tubing while maintaining a parallel orientation to one another.

FIGS. 1-11 collectively introduce an example tubing clamp 100. The tubing clamp can include upper and lower clamping surfaces 102 and 104 that have pivot ends 106 and clamp ends 108. The tubing clamp can also include an adjustable hinge member 110, an adjustable clamping member 111, and a force imparting member 112. The adjustable hinge member 110 can secure the pivot ends of the upper and lower clamping surfaces at a user adjustable pivot gap ($G_p$). The adjustable clamping member 111 can releasably secure the clamp ends 108 of the upper and lower clamping surfaces 102 and 104 relative to one another when secured at a user adjustable clamping gap ($G_c$). Then as shown in FIG. 3, the adjustable clamping member 111 can be released and swing away to allow tubing 113 to be positioned between the upper and lower clamping surfaces. In FIGS. 4 and 5, when adjustable clamping member 111 is re-secured, the force imparting member 112 can allow the user to adjust the clamp ends 108 of the upper and lower clamping surfaces 102 and 104 to set a user adjustable clamp gap ($G_c$) until the upper and lower clamping surfaces are generally parallel. (Clamp gap $G_c$ is not labeled on FIGS. 4-5 due to clutter on the drawing page. Please see FIGS. 6-8). This adjustable parallel feature can be employed for narrow tubing as shown in FIG. 4 and larger tubing as shown in FIG. 5. Further, the parallel orientation of the upper and lower clamping surfaces 102 and 104 can provide an even clamping force across the tubing. Other solutions that employ non-parallel clamping forces and/or use pointed clamping surfaces may subject portions of the tubing to higher forces and more distortion and bending to accomplish flow restriction and thus can cause tubing failure and/or leakage and/or cause the tubing to be permanently deformed so that it does not return to its original configuration when the clamping force is removed.

Returning to FIGS. 1-2, in some implementations the upper clamping surface 102 is defined by a generally elongate (in the x reference direction) top clamp bar 114 and the lower clamping surface 104 is defined by a generally elongate (in the x reference direction) bottom clamp bar 116. Also, the hinge member 110 can be manifest as a hinge post 118 and the clamping member is manifest as a clamp post 120 and force imparting member 112 is manifest as a clamping knob 122. The hinge post 118 rotates around hinge point 124(1) and the clamp post 120 rotates around hinge point 124(2). The top clamp bar 114 can include top clamp bar slot(s) 126 (FIGS. 2-3) or another element for selectively retaining the clamp post 120 relative to the top clamp bar 114.

As can be appreciated from FIG. 1, the tubing clamp 100 can also include a visual indicator 128 that can aid the user in adjusting the tubing clamp for a specific size of tubing and/or in maintaining the parallel nature of the upper and lower clamping surfaces 102 and 104 when applying force to the tubing 113 (FIGS. 3-5). In this case, the visual indicator 128 is manifest as a window 130 formed in top clamp bar 114 and indicators 132 on the hinge post 118. The user can align an individual indicator 132 in the window 130 for a specific tubing size. In the implementations of FIGS. 1-11, the indicators are numerals. For instance, if the user wants to use ½ inch tubing, the user can turn the top clamp bar 114 until indicators 132 on the hinge post 118 comprising "½" is visible in the window 130 on the top clamp bar 114. Indicators in the form of colors or patterns are described below relative to FIGS. 12-13.

As can be appreciated from FIGS. 3-5, the example tubing clamp 100 can hingedly secure the hinge post 118 to the bottom clamp bar 116 at hinge point 124(1) and hingedly secure the clamp post 120 to the bottom clamp bar 116 at hinge point 124(2). In this example the hinge post 118 is threaded to allow the user to adjust the overall dimension of the hinge or pivot end 106 length (e.g., gap $G_p$). This can be done by releasing clamp post 120 from top clamp bar slot 126 as shown in FIG. 3. The clamp post can be pivoted away from the top clamp bar 114 which can also be pivoted upward. The top clamp bar 114 can then be turned in relation to the bottom clamp bar 116 through one full revolution (e.g., clockwise (CW) to decrease the gap $G_p$ (FIG. 1) or counterclockwise (CCW) to increase gap $G_p$). By specifying the thread pitch of the threaded hinge post 118, the overall travel can be controlled by the alignment with the clamp post 120. By adjusting the clamp opening using the threaded hinge post 118, the faces of the top and bottom clamp bars 114 and 116 can be maintained in a parallel arrangement (e.g., gap $G_p$ equal to gap $G_c$) to allow the clamping action to be uniform across the upper and lower clamping surfaces 102 and 104.

Another aspect of the inventive concepts involves the visual indicator 128. In this case, window 130 and indicators 132 can facilitate a uniform and repeatable clamping force for a given tubing size. The threaded hinge post 118 can be marked at specific and uniform locations. The top clamp bar has window 130 (e.g., locating feature) that allows the user to very accurately verify that the tubing clamp 100 is set to the desired clamping dimension.

Viewed from one perspective, in some implementations the top and bottom clamp bars 114 and 116 of the tubing clamp 100 can work more effectively when top and bottom clamp bars 114 and 116 are aligned in parallel. To use a specific example, if the thread pitch of the threaded hinge post 118 is 12 threads per inch, each specific revolution will allow the tubing clamp 100 to open or close by 0.083" per revolution (2.1 mm). When the top clamp 114 is aligned with the bottom clamp 116, the exact calibrated feature setting will be visible in relation to the locating feature.

In some configurations, to implement the device a user would loosen the clamping knob 122 to release the clamping force. By swinging the clamp post 120 out of the top clamp bar slot 126, the tubing clamp 100 can be opened and flexible tubing 113 can be inserted between the top and bottom clamp bars 114 and 116. The threaded clamp post 120 is returned to the top clamp bar slot 126 and by tightening the clamping knob 122 the tubing clamp 100 can be forced closed, thus sealing (and/or controlling flow) of the intended tubing 113. Note that while the top clamp bar slot 126 extends generally parallel to the x reference direction in the illustrated implementation, in other implementations, the top clamp bar slot 126 could extend generally parallel to the y reference direction.

To adjust the tubing clamp for an alternate tubing size or wall thickness, the user can adjust the top clamp bar 114 in relation to the bottom clamp bar 116 until the calibration and locating features (e.g., window 130 and indicators 132) match the specification for such tubing 113.

Figure 6:
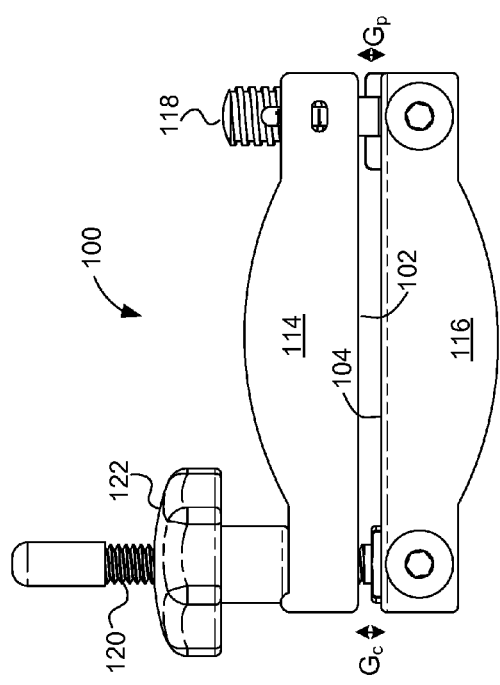
Figure 8:
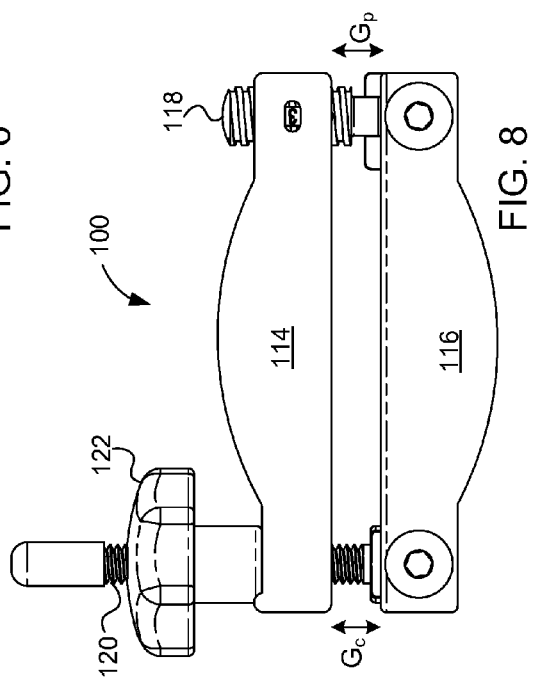

FIGS. 6-8 collectively illustrate how hinge post 118 can be adjusted in top clamp bar 114 to set a desired pivot gap $G_p$ and then utilize the clamp knob 122 to adjust the clamp end gap $G_c$ so that it is equivalent and thus cause the upper and lower clamping surfaces 102 and 104 to be parallel while imparting force on the tubing (FIGS. 3-5). Thus, upper and lower clamping surfaces are parallel in FIGS. 6-8, but the distance between the upper and lower clamping surfaces increase from FIG. 6 to FIG. 7 and from FIG. 7 to FIG. 8.

Figure 11:
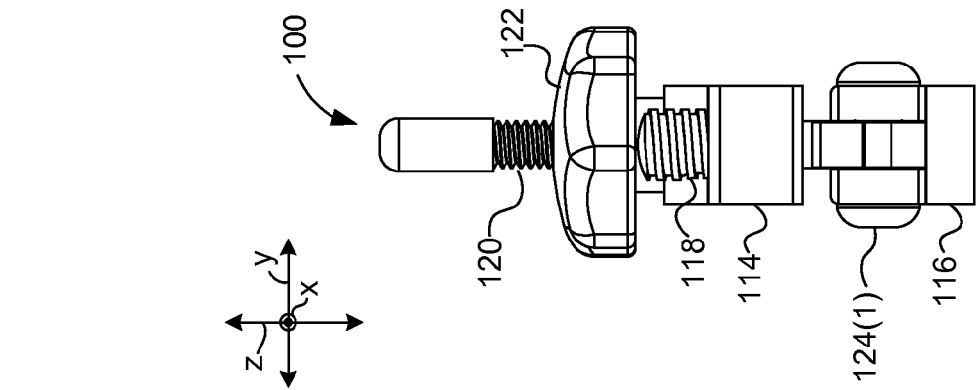
FIGS. 10-11 illustrate end elevational views of tubing clamp examples in accordance with some of the present concepts.
Figure 10:
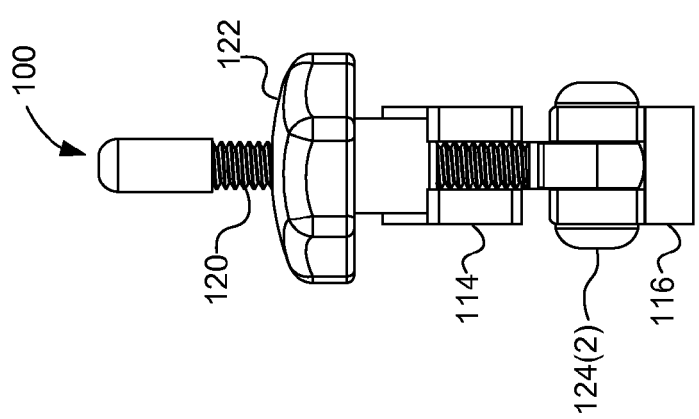
Figure 9:
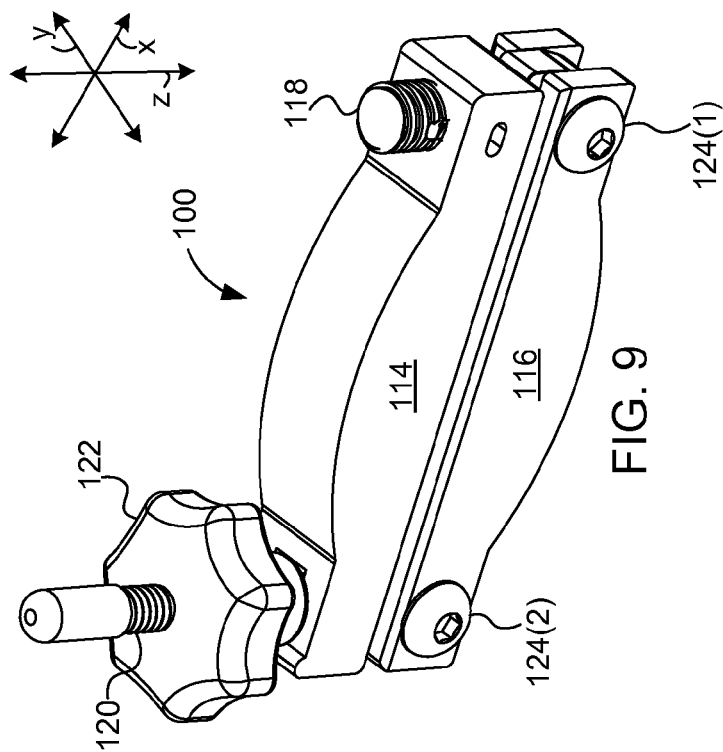

Note that FIGS. 9-11 show hinge post 118 threaded directly into top clamp bar 114 (e.g., the hinge post can be viewed as the male portion and the top clamp bar can be viewed as the female portion). However, other implementations can allow the female threaded portion of the adjustment feature to swivel or move to allow for greater adjustment. Other implementations can employ threading on both top and bottom clamp bars 114 and 116 rather than just on the top clamp bar in the illustrated configuration. For instance, the hinge points 124(1) and 124(2) can be threaded with female threads to allow the respective hinge post 118 and clamp post 120 to be adjusted relative to the bottom clamp bar 116. Further, the hinge points 124(1) and 124(2) can be constructed in various ways. For instance, in the illustrated configuration, the hinge points can be studs that extend in the y reference direction through a hole in the hinge post 118 or clamp post 120. Other hinge configurations can be employed. For instance living hinges, snap in hinges, and/or heat staked hinges, among others, can be employed. Further this implementation uses different retaining configurations for the hinge and clamp ends relative to the top clamp bar 114, but other implementations can use similar configurations at both ends.

FIGS. 12 and 13 show an alternative tubing clamp example 100A where clamp post 120 has a clamping knob 122A and hinge post 118 also has a clamping knob 122B. In this case, the hinge post 118 is slidably receiveable through the top clamp bar 114. The hinge post is threaded into the clamping knob 122B. This configuration can allow precise adjustment of the pressure/force applied to the tubing while maintaining a parallel orientation of the top clamp surface 102 and the bottom clamp surface 104.

This implementation also employs visual indicators 128(1) and 128(2) on the clamp post 120 and the hinge post 118 so that the user can readily identify where to adjust each end of the tubing clamp for a given diameter of tubing. This visual indication can be in the form of patterns, such as cross-hatching, or color, or any other pattern or indicator that is readily visible to the user.

Still other implementations can move the location of the threaded features from the top clamp bar 114 to the bottom clamp bar 116. Further, the present implementations lend themselves to use with a wide range of tubing sizes. For instance, a single tubing clamp can be used with tubing ranging from ¼ inch to 1 inch, for example. Further, the implementations can be scaled such that a similar but larger tubing clamp could handle from ½ inch to 2 inch tubing, etc. Thus, many variations in tubing size or format can be covered by a set of relatively few tubing clamps 100A.

Each item in the described implementations can be built from any material suited for the application and function. This may include metal or plastic, among others, employed for strength, ease of fabrication, and/or application environment. The parts may be fabricated in any fashion that suits the application and function. This may include, but not be limited to, injection molding, 3-D printing, machining, casting etc.

The inventive concepts are not specific to any market or application and additional configurations and applications are contemplated.

CONCLUSION

Although specific examples of tubing clamps are described in language specific to structural features, it is to be understood that the subject matter defined in the appended claims is not intended to be limited to the specific features described. Rather, the specific features are disclosed as exemplary forms of implementing the claimed statutory classes of subject matter.

The invention claimed is:

1. An adjustable clamp for flexibly resilient tubing, comprising:
    a generally elongate bottom clamp bar defining a generally planar lower clamping surface extending between a hinge end and a spaced apart clamp end;
    a generally elongate top clamp bar defining a generally planar upper clamping surface extending between a hinge end and a spaced apart clamp end;
    a threaded hinge post hingedly secured to the hinge end of the bottom clamp bar and threadably adjustably secured to the hinge end of the top clamp bar to allow the hinge end of the top clamp bar to be adjusted closer to the hinge end of the bottom clamp bar or more distal from the hinge end of the bottom clamp bar by rotating the top clamp bar about the threaded hinge post;
    a threaded clamp post hingedly secured to the clamp end of the bottom clamp bar and swingably received by the clamp end of the top clamp bar into a clamp bar slot defined in the clamp end of the top clamp bar; and, a clamping knob threadably adjustably secured to the threaded clamp post and configured to be adjusted downward against the top clamp bar when the top clamp bar is swingably receiving the threaded clamp post in the clamp bar slot to force the generally planar upper clamping surface of the clamp end of the top clamp bar toward the generally planar lower clamping surface of the clamp end of the bottom clamp bar.

2. The adjustable clamp of claim 1, wherein the threaded hinge post extends along a length and the threaded hinge post includes visual indicators along a portion of the length and wherein the hinge end of the top clamp bar defines a window that allows visualization of a portion of the threaded hinge post having the visual indicators and the visual indicator visible through the window changes relative to the position of the top clamp bar upon the threaded hinge post.

3. The adjustable tubing clamp of claim 2, wherein the threaded hinge post and the threaded clamp post both include corresponding visual indicators arranged from end of the threaded hinge post and the threaded clamp post proximate the bottom clamp bar and extending upward therefrom toward the top clamp bar; and
 a window defined in the clamp end of the top clamp bar allows visualization of a portion of the threaded clamp post and the visual indicators thereon.

4. The adjustable clamp of claim 3, wherein the corresponding visual indicators comprise serially arranged colors on the respective threaded posts.

5. The adjustable clamp of claim 1, wherein the adjustably secured hinge ends of the upper clamp bar and the lower clamp bar allow a user to set a distance between the hinge ends when the clamp ends are released from one another, and wherein upon securing the clamp ends to one another the user can utilize the clamping knob to force the two opposing clamp ends together until the two opposing generally planar clamping surfaces are parallel to one another to thereby constrict fluid flow through the flexibly resilient tube positioned between the two opposing generally planar clamping surfaces.

6. An adjustable tubing clamp to control flow of fluid through a flexible tube, comprising:
 an upper and a lower generally planar clamping surface each clamping surface having a pivot end and a spaced apart clamp end;
 a threadably adjustable hinge member that secures the pivot ends of the upper and lower generally planar clamping surfaces at a user adjustable pivot gap; and
 a threadably adjustable clamping member that releasably secures the clamp ends of the upper and lower generally planar clamping surfaces spacedly adjacent one another when secured, and when released swings away to allow the flexible tubing to be positioned between the generally planar upper and lower clamping surfaces and then when re-secured allows the user to adjust the clamp ends of the generally planar upper and lower clamping surfaces at a user adjustable clamp gap wherein the upper and lower clamping surfaces are parallel.

7. The adjustable tubing clamp of claim 6, wherein the threadably adjustable hinge member comprises a threaded hinge post that is hingedly secured to a lower clamp bar defining the generally planar lower clamping surface.

8. The adjustable tubing clamp of claim 6, wherein the threadably adjustable hinge member is threaded into a top clamp bar that defines the generally planar upper clamping surface, and the top clamp bar is rotatable about the threadably adjustable hinge member to vary the adjustable pivot gap.

9. The adjustable tubing clamp of claim 8, wherein the clamp end of the top clamp bar defines a top clamp bar slot configured to releasably receive the threadably adjustable clamping member.

10. The adjustable tubing clamp of claim 6, further comprising:
 a visual indicator on the threadably adjustable hinge member that indicates a distance corresponding to the adjustable pivot gap.

11. The adjustable tubing clamp of claim 6, further comprising:
 visual indicators on the threadably adjustable hinge member and on the threadably adjustable clamping member that each indicate spacings corresponding to specific sizes of flexible tubing so that the two generally planar upper and lower clamping surfaces are parallel when the flexible tubing is positioned between the two generally planar upper and lower clamping surfaces; and
 the visual indicators on the threadably adjustable hinge member and on the threadably adjustable clamping member are visible to a user when the adjustable clamp is in use.

* * * * *